United States Patent [19]
Carney, III

[11] Patent Number: 5,823,584
[45] Date of Patent: Oct. 20, 1998

[54] VEHICLE MOUNTED CRASH IMPACT ATTENUATOR

[75] Inventor: John F. Carney, III, Worcester, Mass.

[73] Assignee: Vanderbilt University, Nashville, Tenn.

[21] Appl. No.: 727,347

[22] Filed: Oct. 8, 1996

[51] Int. Cl.[6] .................................................. B60R 19/22
[52] U.S. Cl. .............................. 293/102; 293/133; 404/6; 256/13.1; 188/377
[58] Field of Search ..................................... 293/120, 132, 293/133, 142, 1, 38, 102; 404/6; 256/1, 13.1; 188/371, 377

[56] References Cited

U.S. PATENT DOCUMENTS

| | | | |
|---|---|---|---|
| 1,839,015 | 12/1931 | Deveaux | 454/363 |
| 3,141,655 | 7/1964 | Platt | 256/1 |
| 3,643,924 | 2/1972 | Fitch | 256/13.1 |
| 3,845,936 | 11/1974 | Boedecker | 256/1 |
| 3,880,404 | 4/1975 | Fitch | 256/1 |
| 3,907,353 | 9/1975 | Dinitz | 293/102 |
| 4,008,915 | 2/1977 | Walker | 293/102 |
| 4,146,113 | 3/1979 | Gavel | 181/210 |
| 4,190,275 | 2/1980 | Meleti | 293/102 |
| 4,200,310 | 4/1980 | Carney, III | 280/784 |
| 4,583,716 | 4/1986 | Stephens et al. | 256/13.1 |
| 4,600,178 | 7/1986 | Zucker et al. | 256/1 |
| 4,645,375 | 2/1987 | Carney, III | 404/6 |
| 4,658,941 | 4/1987 | Gottwald et al. | 188/377 |
| 4,711,481 | 12/1987 | Krage et al. | 188/377 |
| 4,770,420 | 9/1988 | Gottwald et al. | 293/133 X |
| 5,011,326 | 4/1991 | Carney, III | 404/6 |
| 5,031,947 | 7/1991 | Chen | 293/135 |
| 5,052,732 | 10/1991 | Oplet et al. | 293/102 |
| 5,125,762 | 6/1992 | Strassil | 404/6 |
| 5,199,755 | 4/1993 | Gertz | 293/120 |
| 5,248,129 | 9/1993 | Gertz | 293/133 X |

FOREIGN PATENT DOCUMENTS

| | | | |
|---|---|---|---|
| 2251749 | 10/1992 | Germany | 404/352 |
| 363658 | 12/1931 | United Kingdom | 293/136 |
| 1355653 | 10/1985 | United Kingdom . | |

OTHER PUBLICATIONS

*Roadside Design Guide*; Chapter 8; pp. 8–1 thru 8–22; Amer Association of State Highway & Transportation Officials (1989).

*Primary Examiner*—Joseph D. Pape
*Attorney, Agent, or Firm*—Waddey & Patterson; I. C. Waddey, Jr.

[57] ABSTRACT

A crash impact attenuator designed to be mounted on a service truck or other vehicle including a perimeter band, preferably with an elongated profile having generally arcuate ends spaced from each other and interconnected by opposing links of side walls. At substantially the center of the side walls, a loop of cable or similar high tension material is provided to limit any separation of the side walls from each other. Considering one of the two arcuate ends of the perimeter band as constituting the front of the crash impact attenuator and the other of the two arcuate ends of the perimeter band as constituting the back of the crash impact attenuator, the front of the attenuator is bolted or otherwise connected to the service vehicle to be protected it from impact and the rear of the impact attenuator cantilevers out from the rear of the service vehicle and spaced above the surface over which the service vehicle is traveling. The crash impact attenuator is held in the cantilever position by a cable extending from the rear of the crash impact attenuator to a boom or other standard provided on the rear of the service vehicle. At the front of the crash impact attenuator, two side-by-side cylinders are mounted inside the perimeter band. The two front cylinders are of a size that they are spaced from the cable loop. The rear of the crash impact attenuator has a third cylinder mounted inside the perimeter band and spaced from the cable loop. A grabber mechanism is mounted at the rear of the crash impact attenuator to direct errant vehicles into the attenuator in order to prevent them from rebounding off the system back into the flow of traffic. The entire system is open, devoid of any filler.

18 Claims, 5 Drawing Sheets

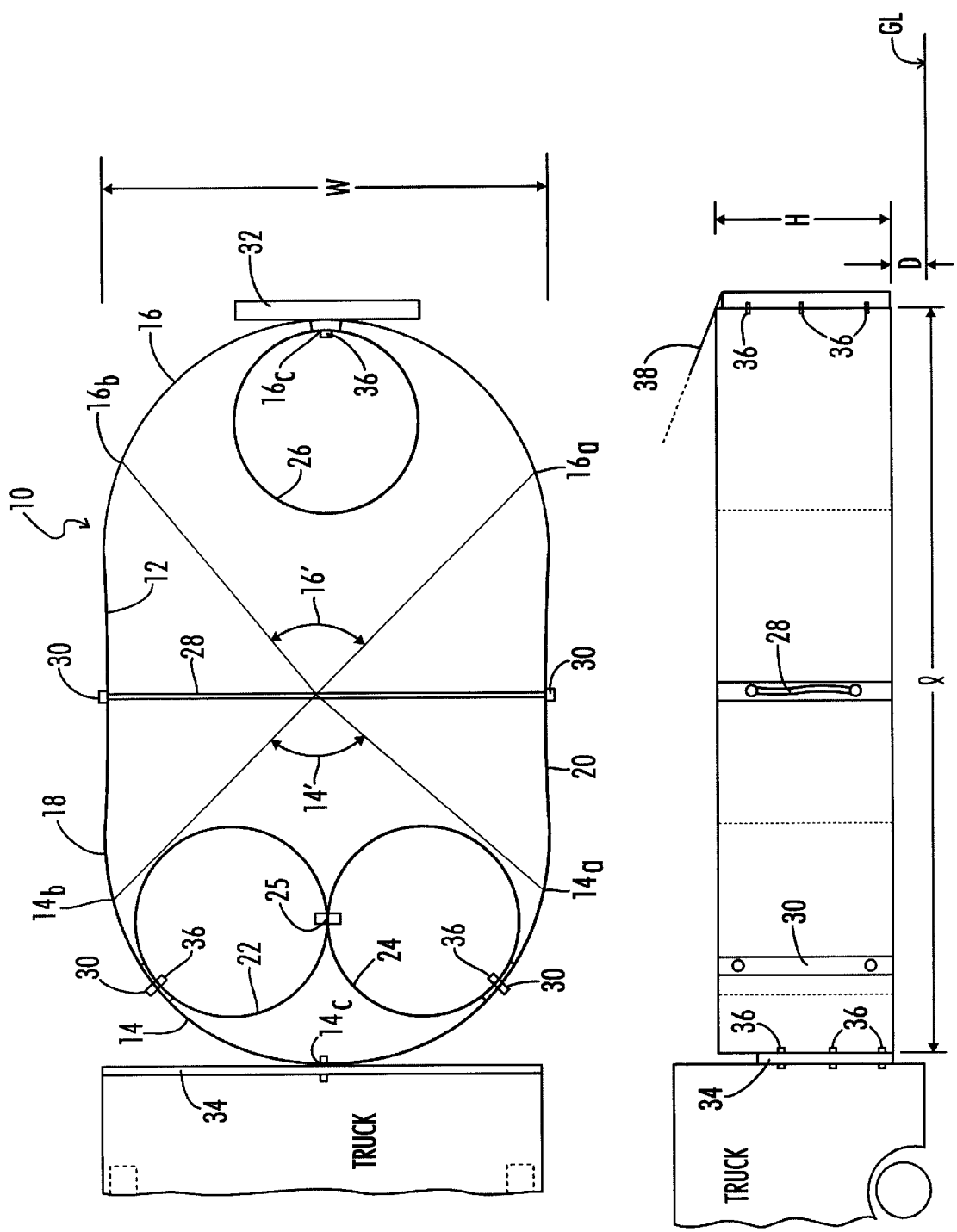

VEHICLE MOUNTED CRASH IMPACT ATTENUATOR

BACKGROUND OF TE INVENTION

The present invention relates generally to crash impact attenuators and more particularly to such crash impact attenuators that are designed for mounting on vehicles such as trucks used in highway maintenance operations. Such systems are commonly referred to as Truck Mounted Attenuators, or TMAs.

Impact attenuation devices are energy absorbing systems employed for reducing the severity of vehicular collisions, especially the type involving a fast moving motor vehicle and a work piece such as a road barrier or a highway service vehicle used in highway maintenance repair operations. The success of crash impact attenuators is measured by the ability of the devices to limit the extent of injuries suffered by people and the damage done by the equipment as a consequence of such collisions.

It will be appreciated by those skilled in the art that public highway and safety departments have employed a variety of accident preventive measures in an effort to prevent and/or reduce the personal injuries and property damage resulting from vehicular collisions occurring on the nation's major highways as well as its local roads. Such accident preventive measures may be classified into two basic categories: warning devices designed to be operative to forestall the occurrence of a vehicular collision and protective devices designed to afford protection to both persons and property in the event of a vehicular collision.

By way of illustration, the category of warning devices includes such items as conventional traffic signs and traffic signals, emergency signs and signals displayed to warn of the temporary existence of a dangerous situation, etc.

Protective devices fall into two classes, i.e., those embodied in a vehicle as part of the construction thereof, and those which are viewed as being separate from the construction of the vehicle regardless of whether the latter are subsequently affixed in some manner to the exterior of the vehicle. Examples of protective devices which fall within the first class, are such things as padded dashboards, seat belts, etc. In the second class, are enhancements such as safety barriers designed to afford protection in the event of a vehicular collision between a moving vehicle and a stationary object or between a moving vehicle and another moving object.

The present invention relates to a protective device of the type falling within the second class of items discussed hereinabove. Even more specifically, the present invention is directed at protecting against the hazardous condition created by the presence on highways and roads of men and equipment engaged in highway maintenance and repair operations. There is an ever increasing need to protect such personnel and equipment from being struck by an errant moving vehicle.

The impact attenuation systems designed for protection against injury occurring from crashes by vehicles into stationary barriers are generally found to be unsuited to provide the desired degree of protection to personnel and equipment involved in conducting highway and road maintenance operations. To provide protection in these situations, what is needed is an energy absorbing barrier that is small, lightweight and portable.

Although most of the attention in the prior art has been directed toward providing various kinds of stationary energy absorbing barriers, there is known to exist in the prior art several different types of portable impact attenuation systems. One such portable energy absorbing system is in the form of a hydro-cell system that consists of five rows of thirteen polyvinyl chloride plastic cells enveloped in a corset-like membrane. The entire unit is mounted on a metal platform, which is designed to be attached to the rear of a highway service vehicle. Each cell contains approximately 3 1/2 gallons of a water-calcium chloride solution. The latter solution functions to provide the system with the desired control crushing characteristics. The hydro-cell portable energy absorbing system, although being portable in nature and relatively easy to install, has been found to suffer from the major disadvantage that can not simultaneously satisfy the energy absorption and minimum stopping distance, i.e., deceleration requirements for moving vehicles impacting there against at speeds in excess of 30 m.p.h.

Another prior art portable impact attenuation system is the modular crash cushion system, which is composed of thirty steel drums, i.e., ten rows with three drums per row. The thirty drums rest on a trailer, which is designed to be attached to a highway service vehicle at 5 points to provide the required degree of horizontal and vertical stability during impact. The principal disadvantage of the modular crash cushion portable energy absorbing system stems from the fact that it is 19 1/2 feet long. As a consequence, because of the need to maintain a rigid interconnection between the trailer and the towing service vehicle at all times, this system has been shown to suffer from severe weigh limitations as concerned both the trailer on which the drums rest and the service vehicle which tows the trailer. In addition, because of its relatively long length, this system has proven to be unsuitable for use on the hilly and curvy sections of highways and roads, which are found to exist in many areas of the country.

Still another portable energy absorbing system uses vermiculite concrete cells contained within a plywood box. Another uses aluminum honeycomb cartridges contained within a box. Another employs a plastic foam filled fibrous honeycomb cartridge and is called Hex-Foam, and another device uses an aluminum honeycomb cell material called Alpha 1000.In addition, the present inventor has developed a variety of systems which can be used in conjunction with either a stationary barrier or on a moving vehicle. These systems are disclosed in U.S. Pat. No. 4,200,310 issued to J. Carney, III, on Apr. 29, 1980; in U.S. Pat. No. 4,645,375, issued to J. Carney, III, issued on Feb. 24, 1987; and U.S. Pat. No. 5,011,326 issued to J. Carney, III, on Apr. 30, 1991. The Carney patents disclose stationary or portable impact attenuation systems which use a series of circular shaped cylinders which are attached together. The cylinders are made of a material which undergoes plastic deformation at a given and predictable force to cushion the blow.

As indicated, truck mounted attenuators present particularly unique problems.

Specifically, because the attenuator is mounted on a vehicle, it is desirable to have a physically compact structure so that the vehicle can be driven from one site to another without having to remove the attenuator. Further, during travel from one site to another, a relatively compact attenuator device would allow the vehicle to be maneuvered around turns and in other situations encountered by the driver of the vehicle, with minimal interference because of the attenuator protruding from the vehicle. In addition, truck mounted attenuators need to be comparatively light weight so that they can be transported during their use and between job sites with relative ease and will not tend to rotate the truck about its rear axle and thereby lift the front of the truck off of the road surface. Finally, truck mounted attenuators should be easily and quickly attached to, and detached from, the vehicle in order to simplify the decision to employ such devices as a part of the regular maintenance program of transportation departments of governmental entities and private organizations.

The goal in developing this high impact capacity truck mounted attenuator (TMA) was to keep the length of the unit to an absolute minimum so that the system could be easily maneuvered when attached to a standard dump truck and employed in maintenance operations. Most stationary crash cushions designed to function under 100 km/h impacts have lengths exceeding 8 meters. This is clearly too long a distance to cantilever from the rear of a service vehicle. The challenge, therefore, was to find that minimum length TMA for which the physics of the problem could theoretically allow the occupant risk requirement to be satisfied under 100 km/h impacts involving an 820 kg automobile on the one hand and a 2000 kg pickup truck on the other. Most 70 km/h TMA's have lengths of in the order of 2.4 meters. In uniformly accelerated rectangular motion, the acceleration is proportional to the square of the velocity. Therefore, it is reasonable to assume that the required length of a 100 km/h TMA should be of the order of $2.4 (100/70)^2 = 4.9$ meters. It would have been relatively straightforward task to design a 100 km/h TMA that was 4.9 meters long. However a TMA of this length would be awkward to maneuver and difficult to support during field use.

Extensive computer simulations were conducted to develop a minimum length design that could satisfy occupant risk requirements. Consideration of the laws of physics led to the conclusion that it was theoretically possible to just satisfy the occupant impact velocity requirement of the light automobile impact and the ridedown acceleration of the heavy pickup truck impact if the length of the Test Level TMA were in the 3.8 meter range.

Engineers have more flexibility in the design of crash impact attenuators to be mounted adjacent bridge abutments, highway dividers and the like as opposed to the design of truck mounted attenuators. In the design of stationary attenuators, the length of the attenuator can be longer and is generally unrestricted by practical considerations involving maneuverability or weight of the attenuator. That is why it is not uncommon to have an attenuator mounted adjacent a bridge abutment that will be 30 feet or more in length. Such attenuators dissipate the energy of a crash over a longer distance and therefore involve less occupant impact velocity with the vehicle interior and ride-down deceleration. There have been some efforts at designing shorter impact attenuators such as the stationary attenuator developed by Fitch and disclosed in U.S. Pat. No. 3,643,924 issued in Feb. of 1992. The Fitch impact attenuator is designed to be installed at the side of the highway in a position to intercept an errant vehicle as it approaches a fixed obstruction such as a bridge abutment (see column 2, lines 60–65 of Fitch '924 patent) and is designed to have an overall length of approximately 11feet (see Fitch '924, column 3, line 10). The Fitch '924 design employs a first and second cylinder enclosed within rails and the assembly "is completed by filling the space in the cylinders and the space between the walls with a dispersible mass such as sand." Thus, the energy of the crash is dissipated by the dispersible mass, in Fitch's example of sand. Other prior art devices have used similar type structures with the cylinders or containers filled with water or some other substance to dissipate the energy created by the impact of the vehicle with the structure. Such devices simply will not work as a truck mounted impact attenuator because of the weight of the sand or water that is carried by the device for energy dissipation purposes.

The prior art in truck mounted attenuators have generally been designed to function under 70 km/h impacts.

What is needed, then, is a truck mounted crash impact attenuator that is approximately 12 feet in length, is lightweight, inexpensive to construct, and will dissipate the energy of the collision of a automobile or pick-up truck traveling at the rate of 60 mph while causing threshold values for occupant impact velocity and ride-down deceleration of no greater than 12m/sec and 20$g$'s, respectively.

SUMMARY OF THE INVENTION

A crash impact attenuator designed to be mounted on a service truck or other vehicle including a perimeter band, preferably with an elongated profile having generally arcuate ends spaced from each other and interconnected by opposing links of side walls. At substantially the center of the side walls, a loop of cable or similar high tension material is provided to limit any separation of the side walls from each other. Considering the two arcuate ends of the perimeter band as constituting the front and back respectively of the crash impact attenuator, the front of the attenuator is bolted or otherwise connected to the service vehicle to be protected it from impact and the rear of the impact attenuator cantilevers out from the rear of the service vehicle and spaced above the surface over which the service vehicle is traveling. The crash impact attenuator is held in the cantilever position by a cable extending from the rear of the crash impact attenuator to a boom or other standard provided on the rear of the service vehicle. At the front of the crash impact attenuator, two side-by-side cylinders are mounted inside the perimeter band. The two front cylinders are of a size that they are spaced from the cable loop. The rear of the crash impact attenuator has a third cylinder mounted inside the perimeter band and spaced from the cable loop. A grabber mechanism is mounted at the rear of the crash impact attenuator to direct errant vehicles into the attenuator in order to prevent them from rebounding off the system back into the flow of traffic. The entire system is open, devoid of any filler. The preferred material for the perimeter band and cylinders of the system is a high molecular weight/high density polyethylene of the type described in my recent U.S. Pat. No. 5,403,112.

BRIEF DESCRIPTION OF THE DRAWINGS

FIG. 1 is a plan view of the crash impact attenuator of my invention.

FIG. 2 is a side view of my crash impact attenuator.

DESCRIPTION OF THE PREFERRED EMBODIMENT

Figure 3:
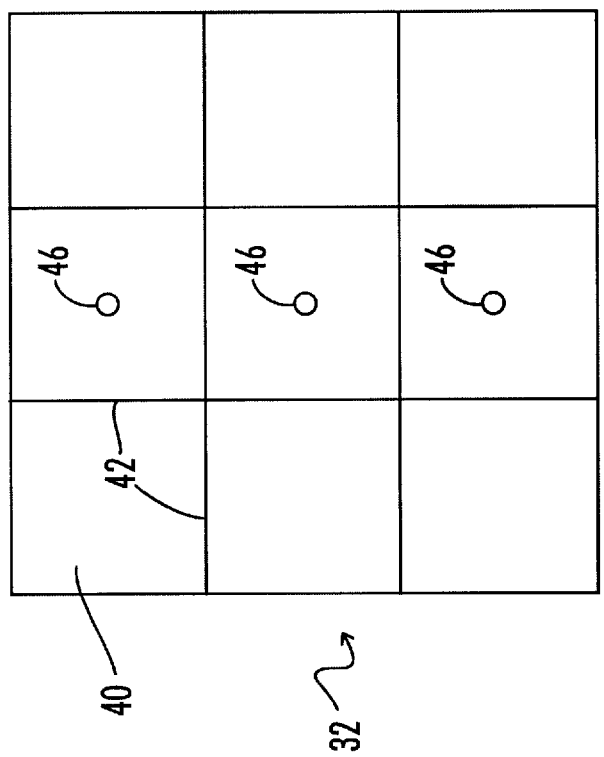
FIG. 3 is a front elevation of the vehicle grabber assembly.

My invention will be best understood when consideration is given to the following detailed description of the preferred embodiment which is given in conjunction with the figures shown in the accompanying drawings wherein like reference numerals represent like parts.

Referring first to FIGS. 1 and 2, the truck mounted attenuator of the present invention is illustrated generally at 10. As can be seen from FIG. 1, which is a plan view of the present invention, the attenuator has an elongated profile outlined by the perimeter band 12. The perimeter band 12 is, in the preferred embodiment, a section of high molecular weight/high density polyethylene pipe having a height H of approximately 0.91 meters and a wall thickness of approximately 48 mm. The section of pipe has been converted from a circular profile to an elongated profile by a loop of cable 28 extending from diametrically opposed sides of the pipe and tightened to pull the sides toward each other.

The perimeter band 12 has arcuate ends 14, 16 defined by arcs 14' and 16' respectively. The front of the truck mounted attenuator 10 is defined by the arc 14 extending from point $14_a$ on the perimeter band to point $14_b$, passing through a point at substantially the center of the arc at $14_c$. On the rear of the truck mounted attenuator is arc 16 extending from point $16_a$ to point $16_b$ and passing through a point $16_c$ at substantially the center of the arc. The two arcs 14, 16 are connected by opposing sides walls 18, 20 with side wall 18 extending from point $14_b$ to point $16_b$ and side wall 20 extending from point $14_a$ to point $16_a$. If FIG. 1 is considered a view from the top of the truck mounted attenuator and FIG. 2 is considered a view from the side of the device, the perimeter band 12 is open inside the perimeter from top to bottom except for the cylinders and cable described hereinafter.

Mounted inside the perimeter of the perimeter band 12 adjacent the front arc 14 are two front cylinders 22, 24. The front cylinders 22, 24 have a radius in the range of 0.45 m and thickness of 37 mm. These cylinders are also substantially the same height as the height H of the perimeter band and preferably are made of the same material as is the perimeter band 12.

The cylinders 22, 24 are connected to each other at point 25 by one or more bolts extending through the cylinders and connecting them at their point of tangential engagement. Front cylinders 22, 24 are also connected to the perimeter band 12 by bolts 36. The connection between the cylinders and the band is at the point where the cylinders intersect with the arc (at a point between point $14_a$ and $14_c$ for cylinder 24 and between point $14_c$ and $14_b$ for cylinder 22). A metal reinforcing strip 30 may be provided on the outside of the perimeter band 12 and on the inside of each cylinder to keep the bolts 36 from pulling through the band or cylinder when a vehicle impacts the attenuator and to also provide vertical stabilization for the height of the perimeter band 12 in order to more properly control the pattern of collapse of the device upon impact.

A plate 34, preferably made of high strength metal, is provided for attachment to the rear of a truck or other service vehicle, and the entire truck mounted attenuator system is connected via bolts 36 to the plate at point $14_c$ where the arc 14 tangentially intersects the plate.

At the rear of the truck mounted attenuator, inside the perimeter of the perimeter band 12, is mounted the rear cylinder 26. The rear cylinder 26 is connected to the perimeter band 12 by a series of bolts 36 spaced vertically along the height of the cylinder 26 at the point where the cylinder 26 tangentially intersects the center $16_c$ of arc 16 of the perimeter band 12. The bolts 36 can also be used to attach the vehicle grabber assembly 32 which is mounted on the outside of the perimeter band 12 at a point of tangential engagement of the grabber assembly 32 with the rear arc 16 at its approximate mid-point $16_c$. The rear cylinder 26 is made of the same material as the front cylinders 22, 24 and is of the same dimensions.

Connected to the opposing side walls 18, 20 at diametrically opposite points is a control cable 28. Control cable 28 is looped about the perimeter band 12, extending through the open center portion of the perimeter band 12, through a hole in the perimeter band adjacent its top edge, through a hole in an elongated metal strip 30, down the length of the metal strip 30 and back through holes in the bottom of the metal strip and band adjacent the lower edge of the perimeter band 12. The control cable continues across the open center portion of the perimeter band 12, through an opening on the opposite side of the band near the bottom edge of the perimeter band, through a hole near the bottom edge of the metal strip 30 on the opposite side of the perimeter band 12, up the metal strip 30, back through a hole in the metal strip and the perimeter band adjacent their upper edge to connect to the cable at its point of beginning. This loop structure of the cable is created of a length sufficient to pull the sides of the high molecular weight/high density polyethylene pipe toward each other to configure the crash impact attenuator 10 in the cross section profile as shown in FIG. 1. Because the perimeter band 12 is constructed from a pipe, the biasing force of the pipe is outwardly against the retaining or control force of the loop of cable 28 passing about the perimeter band 12. Because the side walls of the perimeter band 12 are biased away from each other and the cable 28 is preventing the walls from moving away from each other, the system has a controlled collapse pattern (as will be discussed and illustrated in more detail hereinafter) for effective energy dissipation when errant vehicles collide with the vehicle grabber assembly.

As can be seen from FIG. 2, the truck mount attenuator 10, having a preferred overall length of 3.8 m, is cantilevered from the rear of a truck projecting a distance d of approximately 200 mm above the ground level GL. A support cable 38 is connected to the upper rear portion of the attenuator and extends to a boom (not shown) mounted on the rear of the vehicle to provide additional support for the attenuator to keep it from dragging over the road surface.

Figure 4:
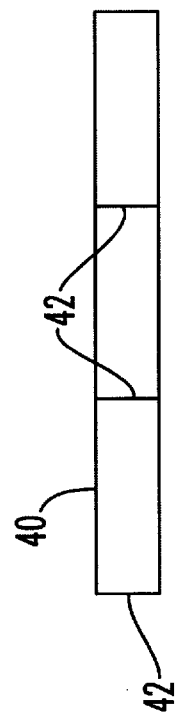
FIG. 4 is a plan view of the vehicle grabber assembly.
Figure 7:
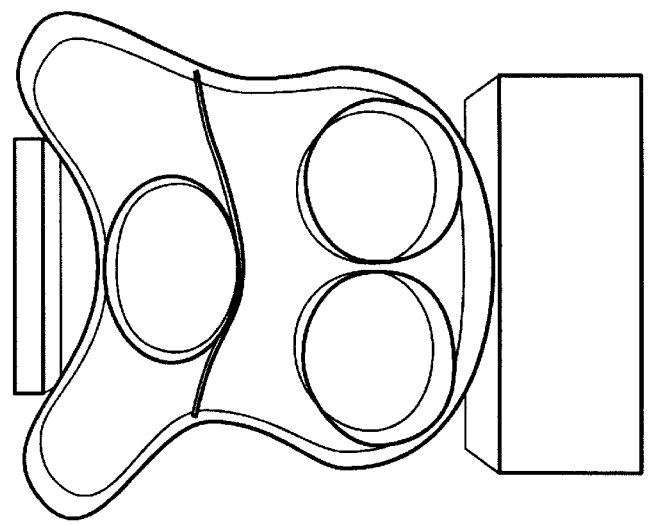
FIG. 7 is a computer generated illustration of the crash impact attenuator of the present invention during the second stage of collapse.
Figure 6:
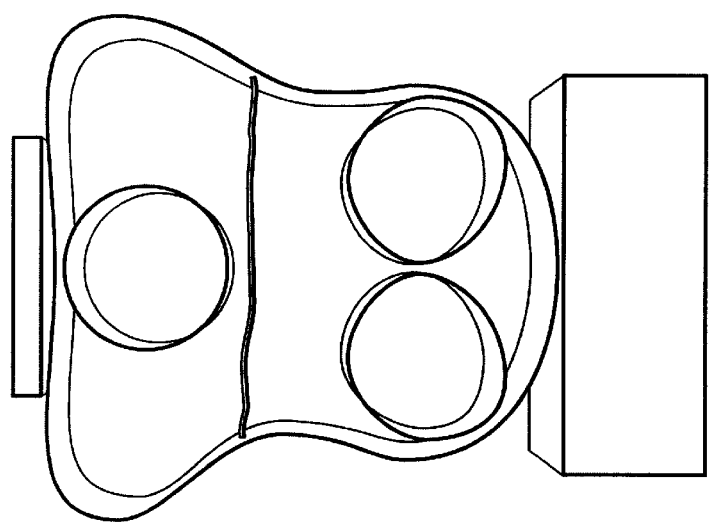
FIG. 6 is a computer generated illustration of the crash impact attenuator of the present invention during the initial stages of impact.
Figure 5:
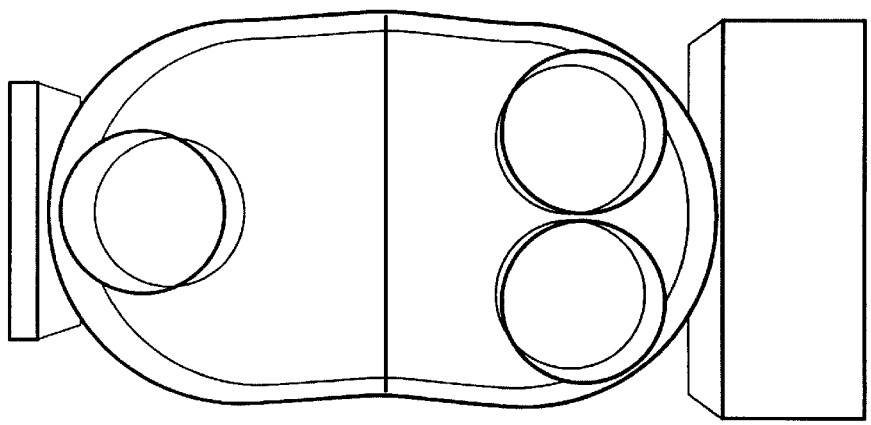
FIGS. 5 is a computer generated illustration of the crash impact attenuator of the present invention in the at rest position.

Turning now to FIGS. 3 and 4, the vehicle grabber assembly of the present invention is illustrated. As can be seen from FIGS. 3 and 4, the vehicle grabber assembly 32 includes a metal plate 40 with a series of holes 46 through which bolts may be passed to mount the grabber to the remainder of the assembly. The grabber is divided into multiple sections by a series of short walls 42 projecting perpendicularly out from the face of plate 40 and around the outside perimeter of the plate 40. The effect of this design is to capture an errant vehicle that runs into the vehicle grabber assembly 32 and direct the force of the errant vehicle into the rear-most portion of the attenuator.

Figure 10:
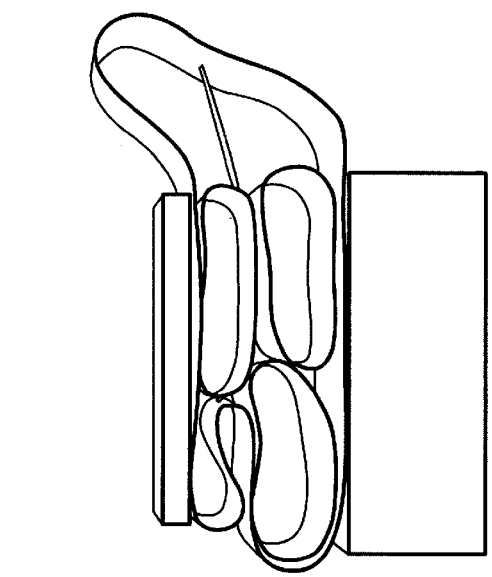
FIG. 10 is a computer generated illustration of the crash impact attenuator of the present invention during the second stage of collapse of the entire unit.
Figure 9:
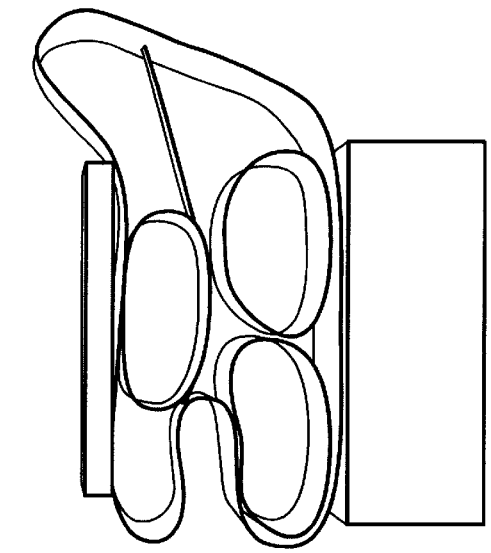
FIG. 9 is a computer generated illustration of the crash impact attenuator of the present invention during the initial deformation of the rear cylinder.
Figure 8:
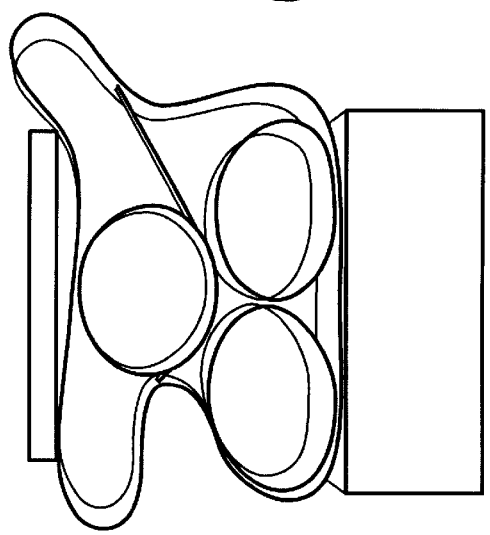
FIG. 8 is a computer generated illustration of the crash impact attenuator of the present invention during the initial deformation of the front cylinders.
Figure 11:
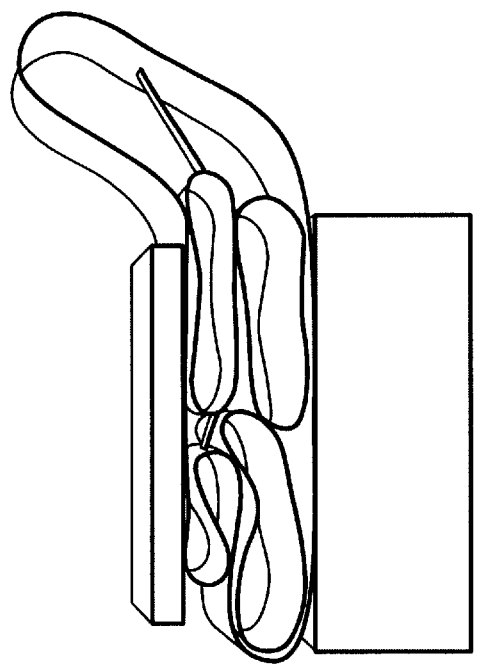
FIG. 11 is a computer generates illustration of the crash impact attenuator of the present invention during the third stage of collapse of the entire unit.
Figure 12:
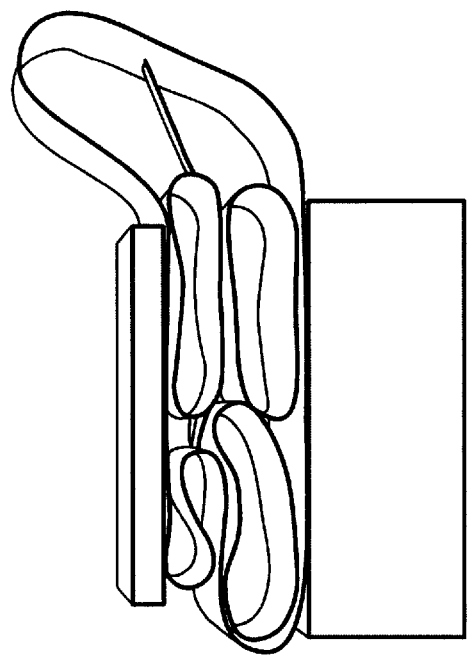
FIG. 12 is a computer generated illustrated of the crash impact attenuator of the present invention during the final stage of collapse of the entire unit.

In operation, when an errant vehicle collides with the rear of the truck mounted attenuator 10, the pattern of collapse of the assembly is shown in the drawings appended hereto as FIGS. 5–12. The drawing are computer generated models of the collapse of the truck mounted attenuator as developed by the inventor and show that the initial collapse (FIG. 6) occurs at the proximate rear half of the attenuator with the portion of the perimeter band 12 from the point of connection of cable 28 to the side walls 18 and 20 and the point $16_c$ collapsing in a bulging fashion until the time that rear cylinder 26 intersects the cable 28. Once the rear cylinder 26 intersects the cable 28 (FIG. 7), the entire assembly moves toward the two front cylinders 22, 24 at the same time compressing the front arc 14 against the plate 34. Once the front arc 14 is compressed, the front cylinders begin to deform in the manner shown in FIG. 8. Next, the entire assembly begins to collapse in the manner as shown in FIGS. 9 and 10. Finally, the cylinders and the perimeter band will collapse upon each other to provide additional impact resistance as shown in FIGS. 11 and 12 to a point of control stopping of the errant vehicle within the tolerance limits previously described in this application.

Applicant has tested a prototype of this invention in two (2) controlled tests. The first controlled test was an automobile weighing approximately 800 pounds impacting the truck mounted attenuator 10, with the truck being parked against an abutment so that it could not move forward in response to the impact of the errant vehicle against the attenuator. This test established that the vehicle could be controlled in the worst of circumstances, a 100 km/h impact with no roll-ahead allowed. Because the light vehicle controlled test results were within tolerable limits, it was unnecessary to conduct a crash impact test using a light vehicle into the truck mounted attenuator mounted on a truck that could project forward upon impact.

The second test conducted by Applicant was of a 4,500 pound pick-up truck traveling at a rate of 100 km/h into the crash impact attenuator mounted on a service vehicle with the service vehicle parked in an open space so that it was free to propel forward upon impact. Once again, this controlled test showed the effectiveness of the present invention. A video cassette of the filming of the test conducted by Applicant using the attenuator of the present invention is enclosed with this application as an exhibit for the Examiner's review and upon issuance of the patent for public inspection.

Although there have been described particular embodiments of the present invention of a new and useful "Vehicle Mounted Crash Impact Attenuator", it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A crash impact attenuator including:
   a. an elongated, continuous perimeter band encompassing an open area,
   b. said crash impact attenuator having a front end, a back end separated from said front end, and opposing sides;
   c. means for connecting said front end of said crash impact attenuator to a work piece to be protected from an errant vehicle;
   d. front cylinders mounted in said open area and attached to said perimeter band proximate the front end of said crash impact attenuator, said cylinders also being connected to each other;
   e. a rear cylinder positioned in said open area and connected to said perimeter band proximate the rear end of said crash impact attenuator;
   f. said front cylinders being spaced from said rear cylinder;
   g. means positioned between said front cylinders and said rear cylinder and limiting said opposing sides from moving away from each other upon an errant vehicle impacting said crash impact attenuator; and
   h. said crash impact attenuator being substantially devoid of any filler material in said open area.

2. The crash impact attenuator of claim 1 wherein there are two front cylinders.

3. The crash impact attenuator of claim 1 further including an axis through said open area, said axis aligned substantially vertically and wherein said crash impact attenuator is substantially open along said axis.

4. The crash impact attenuator of claim 1 further including a vehicle grabber assembly mounted at the front end of the crash impact attenuator.

5. The crash impact attenuator of claim 4 wherein said vehicle grabber assembly includes a plate attached tangentially to said perimeter band.

6. The crash impact attenuator of claim 5 wherein said plate includes walls projecting perpendicularly from said plate to form an array of pockets on said plate.

7. The crash impact attenuator of claim 1 further including metal strips mounted at the point of attachment of said front cylinders to said perimeter band.

8. The crash impact attenuator of claim 1 wherein said limiting means is a loop of cable extending around the outside of said perimeter band.

9. The crash impact attenuator of claim 8 wherein said loop of cable passes through the perimeter band at points adjacent its top and bottom at said opposing sides.

10. The crash impact attenuator of claim 9 further including elongated metal strips mounted between said perimeter band and portion of said loop of cable.

11. The crash impact attenuator of claim 1 wherein said crash impact attenuator is mounted to a service vehicle intended for travel over a ground surface and said crash impact attenuator is spaced from said ground surface.

12. The crash impact attenuator of claim 11 wherein crash impact attenuator is cantilevered from the rear of said service vehicle.

13. The crash impact attenuator of claim 12 further including a support cable connected between said service vehicle and the rear end of said crash impact attenuator.

14. The crash impact attenuator of claim 1 wherein said perimeter band includes a front arc and a rear arc, said front arc and said rear arc spaced from each other and interconnected by opposing side walls.

15. The crash impact attenuator of claim 1 wherein said opposing side walls are biased away from each other and are pulled toward each other by said limiting means.

16. A crash impact attenuator designed to be mounted on a service vehicle including:
   a. a perimeter band formed from a section of pipe, said section of pipe having an axis and being open throughout its length;
   b. means for pulling diametrically opposing points of the section of pipe toward each other to cause said perimeter band to have an elongated cross sectional profile including a front arc and a rear arc;

c. said front arc and said rear arc spaced from each other and connected by opposing side walls;
d. means for connecting said perimeter band to a service vehicle substantially at the midpoint of said front arc;
e. a pair of front cylinders mounted inside said perimeter band and connected to said perimeter band on either side of the midpoint of said arc and connected to each other;
f. a rear cylinder mounted inside said perimeter band and connected thereto at substantially the midpoint of said rear arc;
g. said front cylinders spaced from said rear cylinder;
h. said crash impact attenuator, when mounted on a service vehicle, having its said axis aligned substantially vertically; and
i. said section of pipe being devoid of any filler material throughout its length.

17. The crash impact attenuator of claim 16 wherein said pipe is constructed of a high molecular weight/high density material and said opposing side walls are biased away from each other.

18. A crash impact attenuator designed to be mounted on a service vehicle including:

a. a perimeter band formed from a section of pipe, said section of pipe having an axis and being substantially open throughout its length;
b. means extending between diametrically opposing points on the section of pipe to limit separation of said points;
c. means for connecting said perimeter band to a service vehicle;
d. a pair of front cylinders mounted inside said perimeter band and connected to said perimeter band on either side of said connecting means and connected to each other;
e. a rear cylinder mounted inside said perimeter band and connected thereto at a point diametrically opposed to the location of said connecting means;
f. said front cylinders spaced from said rear cylinder;
g. no cylinders in the space between said front cylinders and said rear cylinder;
h. said crash impact attenuator, when mounted on a service vehicle, being spaced above the surface on which the service vehicle is positioned.

\* \* \* \* \*